March 23, 1937. H. H. PLATT 2,074,342
AIRCRAFT
Filed Sept. 20, 1933 4 Sheets-Sheet 4

INVENTOR
HAVILAND H. PLATT
BY
ATTORNEY

Patented Mar. 23, 1937

2,074,342

UNITED STATES PATENT OFFICE 2,074,342

AIRCRAFT

Haviland H. Platt, New York, N. Y., assignor to Frederick W. Wilkening, Philadelphia, Pa.

Application September 20, 1933, Serial No. 690,212

6 Claims. (Cl. 244—17)

My invention relates to aircraft, and more particularly to aircraft of the rotative winger type, wherein the aircraft is supported to a large extent by rotating surfaces.

One of the objects of my present invention is to provide a rotative-winged aircraft capable of a more or less vertical take-off and capable of hovering, and which will be more maneuverable in all directions.

Another object of my present invention is to enable the rotary wings of an aircraft of this character to be rotated more efficiently under widely differing operating conditions, that is, under operating conditions involving the power-driven operation of the rotor, and under conditions requiring the free rotation of the rotors (with respect to the prime mover or engine) rotated by airflow only.

Another object of my invention is to provide forms of maneuverability not present in aircraft heretofore.

With the above and other objects in view, some of which may appear more fully from the detailed description appearing hereinbelow, my invention may be said to consist of certain novel combinations of elements in an aircraft as set forth particularly in the claims appended hereto.

Thus, one phase of my present invention is the combination, with a fuselage and a multi-bladed rotor, of means for varying the pitch of the rotor blades and means for permitting the rotor to be power driven at times and to be freely rotating at times, (rotated only by the air stream), and means carried by the fuselage for counteracting the torque reaction upon the fuselage of the rotative power supplied to the rotor when the latter is power driven.

Another phase of my present invention consists of the combination, with a fuselage and a multi-bladed rotor, of means for tilting the rotor, (either by tilting the axis of rotation thereof, or by otherwise tilting the effective plane of the rotor) either for control (such as lateral steering, elevational control, lateral balancing and banking), or for deriving a forward-tractive force component from the rotor for supplying or augmenting the forward propulsion of the craft, or for both control and for producing a forward-tractive force component upon the fuselage, and means for counteracting the torque reaction upon the fuselage of the rotative power supplied to the rotor.

Another phase of my present invention is the combination with a fuselage and a multi-bladed rotor, and a propeller adapted to propel the aircraft in a generally forward direction, and of means whereby the power derived from the prime mover (engine or the like), may be delivered to either the rotor or to the propeller, more or less to the exclusion of one or the other, so that the major part of the available power of the prime mover may be supplied to either the rotor or the propeller, at the will of the operator, without the available power being necessarily curtailed by the power requirements of the other member, for which engine power is not required for the particular operating conditions. One embodiment of this phase of my invention involves the combination with the aforesaid elements, either of a variable pitch propeller of any suitable construction, the pitch of which may be varied while in operation, whereby the requirements of the propeller may be reduced either quickly or gradually by decreasing the blade angle to zero degrees or to some point approaching zero degrees, at which the power requirement of the rotor will either be minimum or some reduced or subnormal amount, (for any given engine speed) or may involve, in an alternative embodiment, the use of a clutch or similar means intermediate the engine and the propeller, whereby the propeller may be entirely disconnected from the engine when it is desired to apply a substantial amount or all of the available engine power to the rotor; or, may involve the use of both a variable pitch propeller and a clutch intermediate such propeller and the engine, so that the power requirements of the propeller (at any given engine speed) and hence the forward-tractive force of the propeller, may be either varied gradually by a gradual variation of the propeller pitch, or whereby the power requirements of the propeller and the forward-tractive force of the propeller may be reduced at once to zero by complete disconnection from the engine. This phase of the invention also involves the combination with the aforesaid elements of either a variable pitch rotor or a clutch intermediate the rotor and the prime mover (engine), or both, whereby the power requirement of the rotor may also be varied either gradually by a gradual change of blade pitch, or may be changed suddenly by disconnection of the rotor from the engine. This latter may be effected either by a clutch effective to transmit torque in both directions, or by an overrunning clutch effective only in one direction, or, by the use of both overrunning clutch and two-way clutch, whereby the rotor may be disconnected from the engine, regardless of relative engine speed and rotor speed, and whereby the rotor may also be permitted to rotate independently and free of the engine, whenever the relative rotor speed exceeds the engine speed. Thus, this phase of my invention may be reduced to practice by the combination of either a clutched propeller with or without variable pitch blades, or a variable pitch propeller with or without a clutch, with a freely rotatable rotor clutched to the prime mover either through a clutch or through an overrunning clutch, or both, and having (preferably) variable pitch blades.

My invention further consists of the combination with any of the foregoing phases of my invention, of means carried by the fuselage and adapted to be acted upon by the slip-stream of the rotor, for counteracting the torque upon the fuselage incident to the delivery of power to the rotor from the engine. A further embodiment or extension of my invention is the provision of variable or control anti-torque surfaces or anti-torque means, which may be either varied or controlled by the operator or which may be automatically adjusted according to the changes in operating conditions or which may be automatically set with the varying operating conditions and may also be further subject to adjustment by the operator to permit of a compensation for varying torque conditions or air reactions, or both.

A further phase of my invention includes the provision of anti-torque surface or surfaces, either extending generally longitudinally of the fuselage, as for instance extending rearwardly from the tail end, or extending generally transversely of the fuselage, as for instance extending from the sides of the fuselage in the fashion of fixed wings. In the latter embodiment of this phase of my invention I may provide laterally extending anti-torque surfaces suitably inclined or pitched with respect to the slip-stream of the rotor, which may be tilted, however, into an alternative position wherein said surfaces will be adapted to be acted upon by the slip-stream of the propeller, or acted upon by the air-flow passing the fuselage generally longitudinally thereof, as for instance in forward flight. Thus, this phase of my invention includes the use of laterally extending aerodynamic surfaces, which may be maintained stationarily with respect to the fuselage in any one of two (or more) operative positions, so as to be adapted to be acted upon, or so as to be responsive to, either the slip-stream of the rotor, as for instance in more or less vertical ascent or descent, or to be adapted to be acted upon, or to be responsive to, the slip-stream of the propeller or the air-flow passing generally longitudinally of the fuselage, as for instance in forward flight, either horizontally or inclined. This phase of my invention contemplates the use of such laterally extending aero-dynamic surfaces for anti-torque purposes, while the rotor is power driven and the utilization of the same surfaces for contributing to the lift or suspension of the aircraft in forward flight (either horizontally or inclined forward flight) and for affording lateral stability to the craft while in such forward flight.

In carrying out or reducing to practice any of the foregoing phases or features of my invention, I may provide, and in the preferred embodiments of each of the foregoing phases or features of my invention do provide, a rotor which may be power driven (with the pitch leading in the direction of the desired thrust, that is, propeller-fashion), and which either has a sufficiently small fixed pitch or a sufficiently low minimum (variable) pitch (and such aero-foil cross-section) that when it is permitted to rotate free of the engine, it will auto-rotate in the same direction as when power driven, and under the influence of varying directions of air-flow, (as for instance in horizontal or inclined flight, or in vertical descent), and will exert a force upon the fuselage in the same direction when auto-rotated as when power driven.

The blade angles and aero-foil sections suitable for the desired auto-rotative conditions of the rotor, may be selected according to the now known formula heretofore developed for the aircraft generally known as the autogiro.

If desired, the increase in effectiveness of the rotor during the power driven phase of operation, as for instance in vertical ascent, hovering or slow vertical descent, may be effected either by increasing the power driven speed of the rotor or by increasing the pitch of the rotor blades when power driven, or both. Thus, I may also provide means whereby the mechanical ratio between engine and rotor, or the relative rotary speeds of engine and rotor (when coupled) may be changed, so that the rotary speed of the rotor may be increased also by a step-up in speed ratio. This may be effected by speed change gears of any suitable type, as for instance any of the present conventional types of speed change gears.

Similarly, any suitable means may be employed for varying the pitch of the propeller, as for instance any of the now conventional or known variable pitch propellers may be used. Similarly, while in the drawings I have illustrated, more or less diagrammatically, (merely for purposes of exemplification) a form of variable pitch rotor, any other suitable variable pitch means may be employed for the rotor blades.

Still a further phase of my invention includes certain novel control means whereby the various variations may be effected simultaneously in the manner most suitable for the successive operative conditions, so that the transition from one operative condition to the other may be effected with the minimum amount of manipulation on the part of the operator. Thus, according to this phase of my invention, I may so interconnect the propeller clutch or the propeller blade angle control (or both) with the rotor clutch or rotor blade angle control, (or both) that by one manual operation, such as the shift of one lever or the movement of one control element, the power of the engine may be shifted or transferred (more or less gradually or quickly) from the propeller to the rotor, or vice versa, for the purpose of changing from forward flight to more or less vertical ascent or hovering, or vice versa. So too, I may so interconnect the power controlling clutches or blade angle controls of propeller, of rotor, or both, with the lateral anti-torque surfaces, that said anti-torque surfaces will be set into anti-torque positions whenever the power is shifted or transferred from propeller to rotor, and will be deflected and set into their forward flight positions for contributing to the lift or sustention of the craft whenever the power is shifted or transferred from rotor to propeller.

Another phase of my invention includes the novel combination with a fuselage having an engine or other source of power and a propeller adapted to be driven thereby, of a rotor having a normal auto-rotative speed relatively greater than the normal engine speed, and an overrunning or free-wheeling clutch intermediate the engine and the rotor, all so arranged that the rotor may automatically free-wheel and hence auto-rotate whenever the engine is running at normal speed required for driving the propeller or at lower speeds, and so that the rotor will be automatically engaged by the engine, (through the overrunning or free-wheeling clutch) whenever the relative rotor speed is decreased, to a point where the driving member of the overrunning or free-wheeling clutch tends to travel faster than the driven member of such clutch. This automatic engagement of the rotor by the engine may be brought about by increasing the relative speed of the engine (above its normal speed) as for instance by decreasing the power requirement of the propeller, either through declutching the propeller or through decreasing the pitch of the propeller, or possibly by increasing the throttle setting of the engine. This automatic engagement of the rotor by the engine may also be brought about by decreasing the relative speed of the rotor below its normal auto-rotative speed, as for instance by increasing the pitch or blade angles of the rotor blades, or by suitably changing the angle of the rotor shaft or axis with relation to the fuselage or with relation to the air-stream bearing upon or influencing the rotor. The former of these means however, that is, the increase of the pitch or angles of the rotor blades, is preferable, because by this means the rotor is at the same time set into a more efficient condition for power drive. It is to be understood, naturally, that in speaking of the normal auto-rotative speed of the rotor and in speaking of engine speed, relative speeds are to be understood, because, obviously, the normal engine speed and the normal auto-rotative speed of the rotor may be so related to each other, and probably would be so related to each other, that the actual rotor speed of the rotor in its normal auto-rotative condition would be less than the actual rotational speed of the engine at its normal speed. Thus, the normal auto-rotative speed of the rotor may be 180 R. P. M., while the normal speed of the engine may be 1800 R. P. M. Thus, the power transmission from the engine to the rotor would include any suitable means, such as reduction gearing, as for instance, bevel gears and pinions, for producing a mechanical ratio which will give a speed reduction of ten to one (more or less) from engine shaft to rotor shaft. Hence it is the relative or equivalent speed that is to be reckoned with and not the absolute speed of engine shaft and rotor shaft when considering this or any other phase of the present invention. Thus, if the normal engine speed were 1800 R. P. M., the rotor, according to this phase of my invention, would be so designed that, for instance with a speed reduction of ten to one from engine shaft to rotor shaft, the rotor would have normal auto-rotative speed of something in excess of 180 revolutions per minute, as for instance 190 R. P. M., 200 R. P. M., or more. By this means, the engine may be utilized for the normal propulsion of the craft through the propeller, without the rotor deriving any power from the engine during forward flight. The normal auto-rotative speed of the rotor, as is known in the art of rotor construction, may be fixed by the aerofoil cross-section; by the pitch or blade angle of the rotor blades; and by the other dimensions of the rotor according to formulae now well known in the rotor design art. Thus, if a variable pitch rotor is employed, it is so arranged and designed that a predetermined pitch setting of the blades, which may be the minimum pitch setting of the blades, will produce (in conjunction with the particular aerofoil cross-section of the blades and in conjunction with the other dimensions of the blades) a normal auto-rotative speed for the rotor which will be suitably in excess of the relative normal engine speed. In this embodiment, by increasing the blade angle of the rotor, the rotor will be automatically slowed down to a point where it is automatically engaged by the engine through the free-wheeling or overrunning clutch. In this phase of my invention no manual or complete two-way clutch need be employed between engine and rotor, since the engagement and disengagement of engine and rotor may be effected wholly by the relative engine shaft speeds and rotor shaft speeds.

For the purpose of illustrating my invention, I have shown in the accompanying drawings forms thereof which are at present preferred by me, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts.

In carrying out my invention any suitable fuselage, such as the fuselage 10 may be employed, having an engine or other suitable prime mover 11 mounted either at the front end thereof or at any other suitable point. The structural features of the fuselage are not shown in the drawings, because the fuselage construction per se is not any part of my invention, and my invention is not limited to any particular fuselage construction. Thus the structural elements of which a fuselage may be constructed or fabricated in any usual or conventional manner, may be dictated by mere structural designing skill and judgment; it being understood that the outline of the fuselage shown in the drawings may be any suitable fuselage of sufficient strength and weight, and of sufficient members to form an adequate supporting structure for the elements associated with the fuselage, the various combinations of which (elements) constitute my invention or the various phases thereof. Any suitable landing gear or undercarriage 12 and landing wheels 13 may be provided. Similarly, any suitable tail-skid or wheel 14 may be provided.

Above the fuselage 10 any suitable pylon or other suitable supporting structure 15, may be provided, formed of any suitable number of structural or brace members 16 and 17, which will give the necessary support for the overhead rotor system; which will give the necessary torque resistance to permit the transmission of power from the engine in the fuselage to the rotor by torsional drive, and which will give the necessary pendant support for the fuselage when in flight. In the embodiment of the invention shown, the pylon is shown to consist of three upwardly converging brace members including a single forward brace member 16 and a pair of rearward brace members 17, all converging towards each other in an upward direction and being suitably united to, or affixed to a suitable rotor-supporting housing 18. The rotor, designated in its entirety by the numeral 19, may consist of any suitable number of blades or lift members 20 (four being shown in the drawings for purposes of illustration), which are carried by a common hub-like member 21;—the latter in turn being carried by the generally upright rotor pivot or shaft 22.

In this embodiment of my invention, the pivot or shaft 22 of the rotor is tiltably arranged with relation to the fuselage so that its angular relation to the fuselage may be varied within suitable angular limits for purposes of control or for deriving a forward-tractive force component from the rotor.

This tiltable relationship between the fuselage and the rotor pivot or rotor shaft may be effected by (rotatably) supporting the rotor shaft 22 in any means which will permit of the free and universal deflection of the rotor shaft about two right-angularly disposed axes extending at a right angle to, or transversely of the axis of the shaft. Thus, the rotor shaft 22 may be mounted in a gimbal having its two pivotal axes arranged transversely of the axis of the rotor shaft, or the rotor shaft 22 may be mounted in any suitable ball-socket type mounting or means, as for instance the ball-socket means shown in the drawings.

Figure 4:
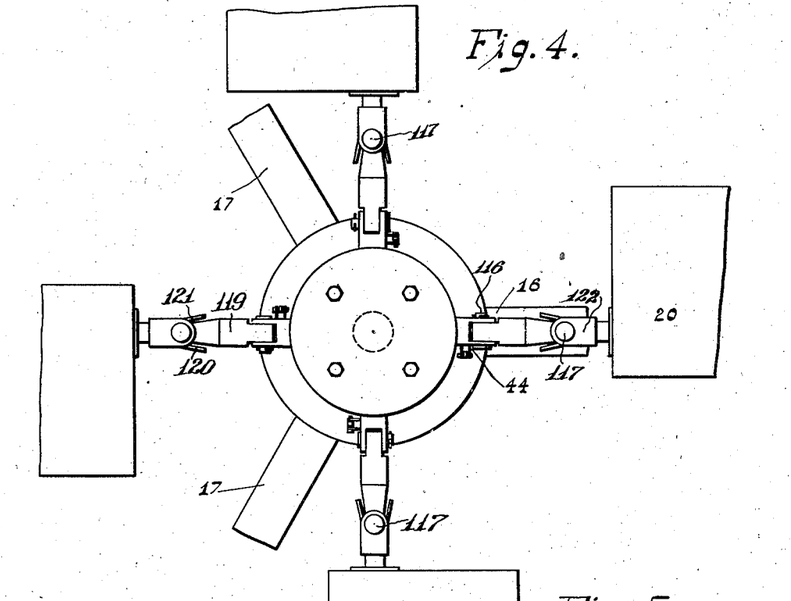
Figure 4 represents a top plan view (on an enlarged scale and also more or less diagrammatically shown) of the center of the rotor system.

Thus in the drawings (particularly in Figures 4 and 5) I have illustrated a generally diagrammatic representation of one form of ball-socket universal mounting of the rotor shaft 22, whereby the rotor shaft may be tilted in all directions freely within suitable angular limits required for the necessary control, or forward-tractive free component.

Thus, for purposes of illustration I have shown the rotor-supporting housing 18 as consisting generally of two halves, that is, a lower half 23 and an upper half 24, secured to each other by any suitable means such as bolts or other fastening means 25, and having an internal spherical surface 26, within which the spherical swivel member 27 is movably mounted. (If desired, anti-friction members, such as ball-bearing members, roller-bearing members or the like, may be operatively interposed between the interior of the housing 18 and the swivel member 27.) Within the generally axial bore 28 of the swivel member 27, the rotor-shaft 22 may be rotatably mounted, as indicated particularly in Figure 5. The rotor-shaft 22 may be suitably journalled between any suitable anti-friction type radial thrust bearings 29 and 30, and between any suitable anti-friction type axial thrust bearings 31 and 32. The thrust collars 33 may be affixed to the rotor-shaft 22 by any suitable means, while the other thrust collar 34 may be detachably secured to the shaft 22 by screw-threading onto the shaft or by any other suitable means, and is also locked in place.

In order that the spherical swivel member 27 may not rotate about the axis of the rotor-shaft 22, one or more locking members 35 may be provided. These locking members 35 may be in the form of suitable projections anchored in the housing 18 and extending into suitable parallel-walled slots or key-ways 36. If desired, parallel-walled guide blocks 37 may be rotatably mounted on the inner ends of the key pins 35, which blocks may then be adapted to slide freely between the parallel walls of the key-ways 36. By this means, the universal deflection of the swivel member 27 is limited to deflection about two right-angular axes which extend transversely of the shaft 22, without however being permitted to rotate about the axis of the shaft 22.

The rotor blades 20 are preferably connected with the hub member 21 in such a way that the angle of the blades may be varied. This may be effected in any suitable manner, as for instance in the manner shown in Figures 4 and 5, wherein the hub member 21 is formed of two separable portions, as for instance, the upper portion 39, and the lower portion 38, between which the generally radially disposed blade pivots 40 are rotatably mounted. Anti-friction type or other suitable thrust bearings 41 may be interposed between any suitable shoulder 42 of the housing and the thrust collars 43, preferably formed integrally with the pivots 40 to give radial support to the pivots and the blades 20, sufficient to resist the centrifugal forces, while in operation.

Any suitable conventional means may be provided for varying the pitch or angle of the blades 20. Merely for purposes of illustration, I have shown, somewhat diagrammatically, means for effecting this blade angle or pitch variation. Thus, any suitable brackets or arms 44 may be provided on each pivot, which may be engaged by connecting links 45 connected to a common slidable collar or other similar member 46 which is slidably mounted in relation to the shaft 22, whereby the axial movement of said member 46 in relation to the shaft will cause a corresponding deflection of all blades about the axis of their respective radially-disposed pivots 40, thereby to vary the angle or pitch of said blades.

The collar or other equivalent means 46 may be keyed to the shaft 22 by means of a key 47, whereby it will be caused to rotate in unison with said shaft, without its axial movement with relation to the shaft being hindered (within the limits of the necessary displacement). The collar or equivalent member 46 may be provided with an annular groove 48 whereby the collar may be at all times engaged by the forked arm 49 having inwardly extending radial pins or other members 50 extending into the groove 48 and engaging the groove at all times from two diametrically opposite points. The bifurcated or forked arm 49 may be pivoted at any suitable point 51 upon any stationary bracket 52, which may be carried by the swivel member 27.

In the particular exemplification of my invention shown in the drawings, the operation of the rotor-pitch-control is shown as being a connecting link or rod 53, which is connected to the outer end of the lever 49 by means of a universal ball-socket type joint 54, which in turn is connected to a rocker arm 55 pivotally supported at 56 to a connecting rod or link 57, by means of which the control is connected to a manually operable lever 58, having its pivotal support at 59, and suitably located with respect to the cockpit or pilot's seat 60.

The propulsion of the rotor may be effected by any suitable transmission from the engine 11, as for instance the meshing bevel gears 61 and 62, the former being suitably mounted and fixed to the rotor shaft 22, and the latter being mounted upon a shaft 63 journalled in any suitable supporting or bearing bracket 64. Any suitable joint 65 connects the shaft 63 with any shaft 66, which is connected in turn through any suitable universal joint 67 to a shaft 68. The shaft 68 is in turn connected through any universal joint 69 with a shaft 70 on which the bevel gear 71 is fixed. The lower end of the shaft 70 is suitably journalled in the bearing bracket 72.

A bevel gear 73, carried upon any suitable shaft journalled in the bearing 74, is in mesh with the gear 71. Through any suitable conventional clutch 75 (not shown in detail) the bevel gear 73 may be connected to the rear end of the engine shaft 76. The clutch 75 may include also any overrunning clutch element in addition to a complete or two-way clutch, whereby the clutch will be self-acting in one direction, regardless of external control, so that the rotor may not be retarded or hindered in its rotation by the engine if the engine should be slowed down below the rotational speed of the rotor. In the preferred embodiment of an overrunning clutch, the latter is preferably placed at the top intermediate the bevel gear 61 and the shaft 22, so that when the rotor is in auto-rotative operation, the geared transmission or other suitable power transmission means may be totally inoperative or stationary, particularly if the clutch 75 is "de-clutched" or placed into a disconnecting position.

The propeller 77 may be either a fixed-pitch propeller or may be a variable-pitch propeller of any suitable form, as for instance any of the conventional type or any other variable-pitch propeller, which may be adjusted while in operation. Any suitabe clutch or propeller-pitch-varying or controlling means 78 (not shown in detail) is operatively related to the propeller and propeller shaft, so that the propeller may be rotationally disconnected from the engine at any time and again rotationally connected to the engine at any time, at the will of the operator, or whereby the pitch of the propeller may be varied from any desired pitch required for the desired traction, and required for the most efficient operation at any particular speed. As stated hereinabove, both variable pitch propeller and clutch may be used so that the power input into the propeller may be varied either gradually or suddenly, as may be desired. Thus, I may so interconnect or so interrelate the propeller-pitch-adjusting means and the propeller clutch, that the clutch is caused to be set into its disconnecting position only after or about the time when the pitch of the propeller has been set approximately to zero degrees or to the angle at which the power requirements of the propeller are approximately at the minimum. In the drawings no effort has been made to illustrate in detail either a pitch-control mechanism for the propeller 77 or a clutch. Thus, the element 78 is intended to represent, diagrammatically, either a clutch or a pitch-varying element or both clutch and pitch-varying element, which in that case are adapted to act in the sequence hereinabove stated. So too, the means for varying the pitch of the propeller 77 may be some means similar to the pitch-varying means of the rotor indicated in Figures 4 and 5, or it may be any other suitable pitch-varying mechanism known in the propeller art.

Figures 1, 2, 3:
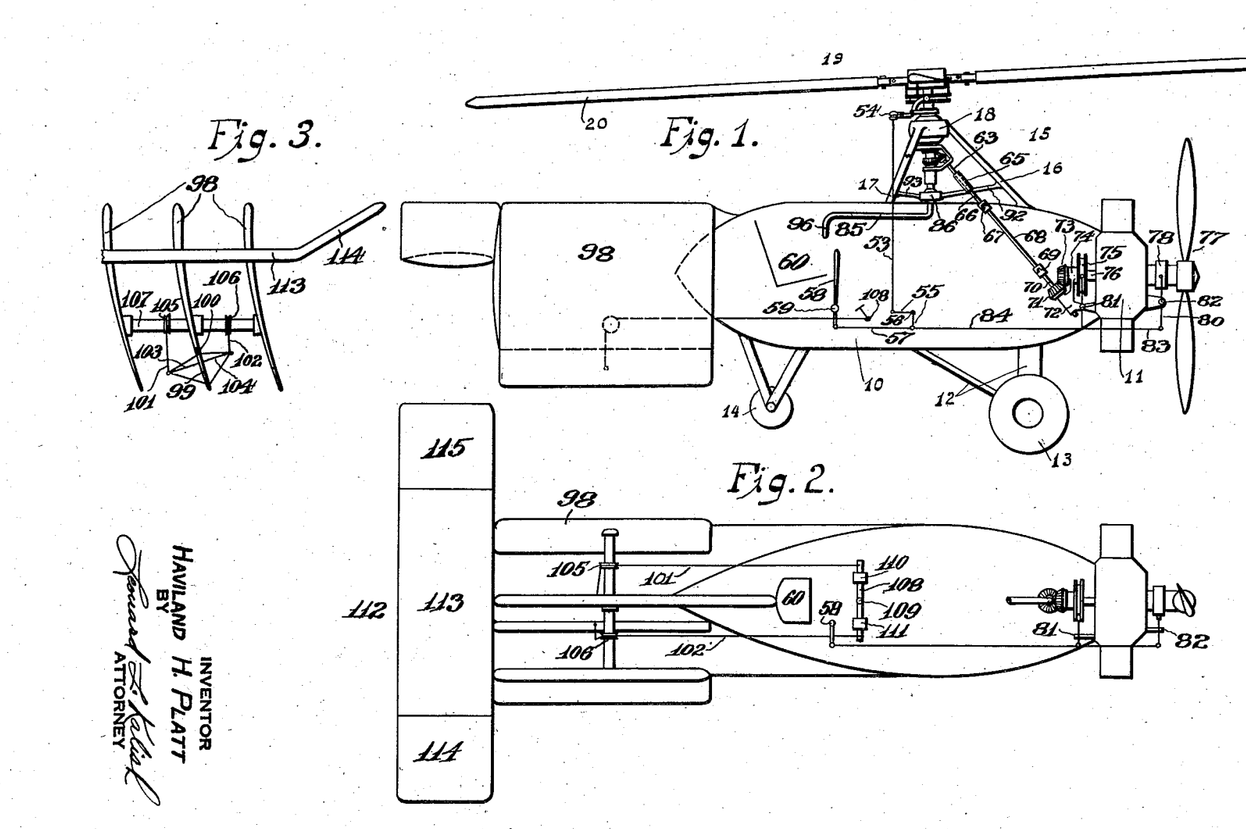
Figure 1 represents a more or less diagrammatic side-elevational view of an aircraft showing one embodiment of my invention.
Figure 2 represents a top plan view of the same.
Figure 3 represents an end elevational view of the anti-torque surfaces and controls and of the stabilizer surface (partly broken away)

In Figures 1 and 2 I have illustrated, diagrammatically, a common control connection between the elements 75 and 78. This common control connection may be in the form of levers 79 and 80, having their pivotal supports at 81 and 82, respectively, and being flexibly connected with the clutch 75 and the clutch or pitch-control 78 by any suitable conventional means such as the forked lever end running in and engaging a grooved collar. A common connecting rod or link 83 and the rod 84 serve to connect the control levers 77 and 80 with the rocker arm 55, so that by means of the single control stick or control arm 58 the power of the engine may be shifted or transferred from the propeller to the rotor, or vice versa, and whereby the pitch of the rotor blades may be increased simultaneously with the application of the engine power to the rotor, so that, as the power is applied to the rotor, the blade angles may be increased for greater efficiency in vertical ascent or hovering. In the reverse operation the blade angles or pitch of the rotor blades is decreased and the power disconnected therefrom and connected to the propeller 77 for the forward propulsion of the craft and for the auto-rotation of the rotor. Thus, as the engine power is transferred or shifted from the rotor to the propeller, the blade angle or pitch of the rotor blades is again reduced to the relatively smaller angle required for the more efficient auto-rotative operation of the rotor, so that the craft may be most efficiently sustained by the auto-rotative rotor in forward flight.

Figure 5:
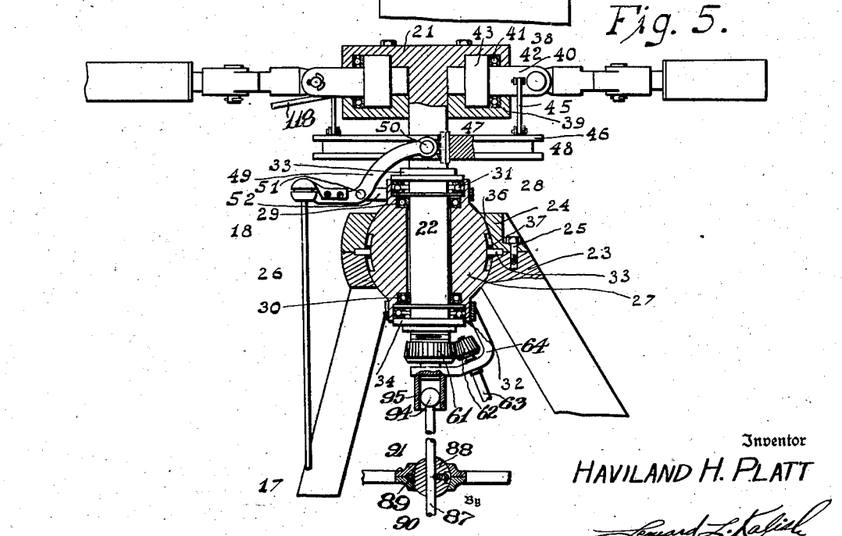
Figure 5 represents a vertical elevational view of the same, partly in section, on line 5—5 of Figure 4.

The means for tilting the rotor with respect to the fuselage may be in the form of a manual control member 85, which is universally pivoted at 86, in any suitable universal pivotal support, as exemplified in Figure 5. Thus the pivotal support may consist of a gimbal support or a ball-socket support, as shown in section in Figure 5, with means provided to prevent the rotation of the upright portion 87 of the control member 85, about its own axis. This means may include the keying of the upright portion 87 of the control member 85 to the spherical or ball-type swivel member 88 or the innermost part of the gimbal, as the case may be. If a ball-socket type swivel is employed, as illustrated in Figure 5, means should also preferably be provided for preventing the rotation of the ball or spherical member 88 about the axis of the upright portion 87 of the control member 85. Thus, the ball may be keyed to the housing 89 by a pin 90 and key-way or slot 91, similar to the pin 33 and key-way 36 forming part of the universal swivel support of the rotor. The swivel housing 89 may also be of two or more pieces suitably united to each other and supported by brace members 92 and 93, connecting to any suitable structural portion of the fuselage or pylon. The upper end of the control rod 87 is connected to the swivelled rotor support by means of any suitable universal and extensible connection, as for instance that shown in Figure 5, wherein a spherical contact member 94 on the end of the rod 87 extends into a hollow sleeve 95 rigidly fastened to, or carried by, the swivel member 27. Thus, by deflecting the lower end 96 of the control member 85 laterally, the rotor shaft 22 is deflected laterally in an opposite direction and proportionately to the deflection of the control member. Similarly, a forward or rearward deflection affects the rotor shaft similarly, but in an opposite direction, and to a proportionate extent.

The effective lengths of the control levers and the positioning of the universal fulcrum 86 thereof may be varied according to the design requirements of the aircraft. Thus, the mechanical ratio between the control and the rotor pivot may be considerably increased, so that the rotor may be deflected with less manual force.

Figure 6:
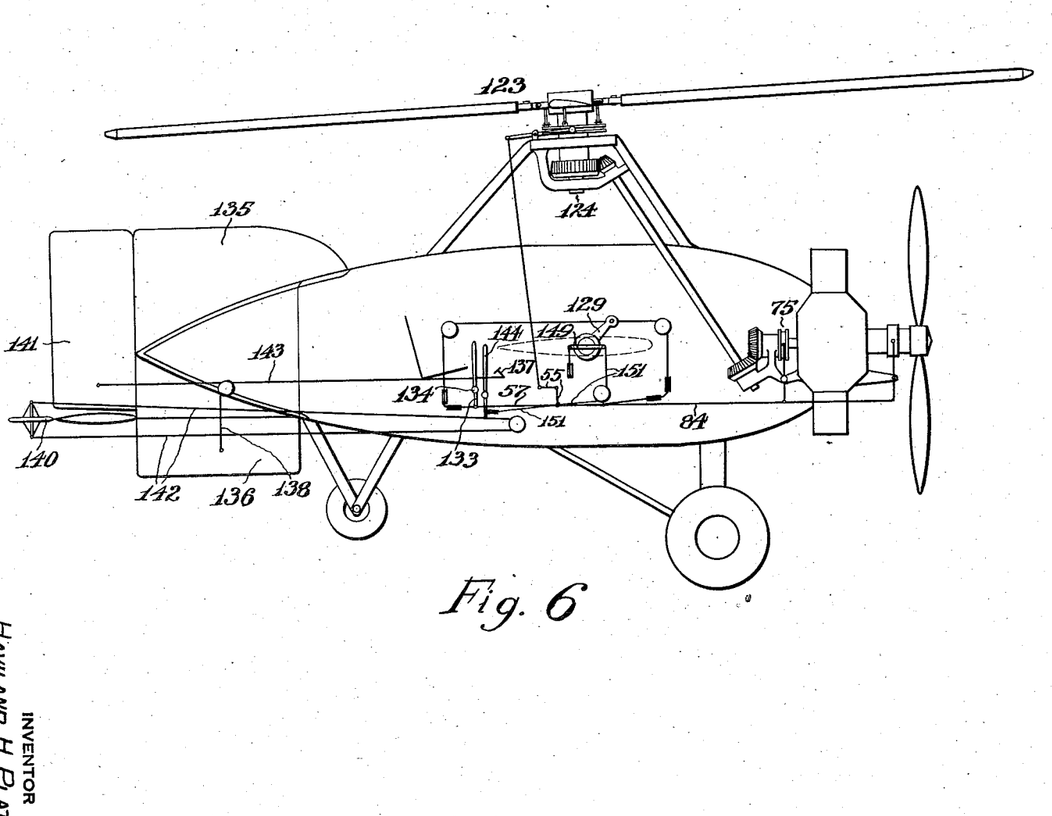
Figure 6 represents a somewhat diagrammatic side-elevational view of an aircraft showing a modified embodiment of my invention.
Figure 7:
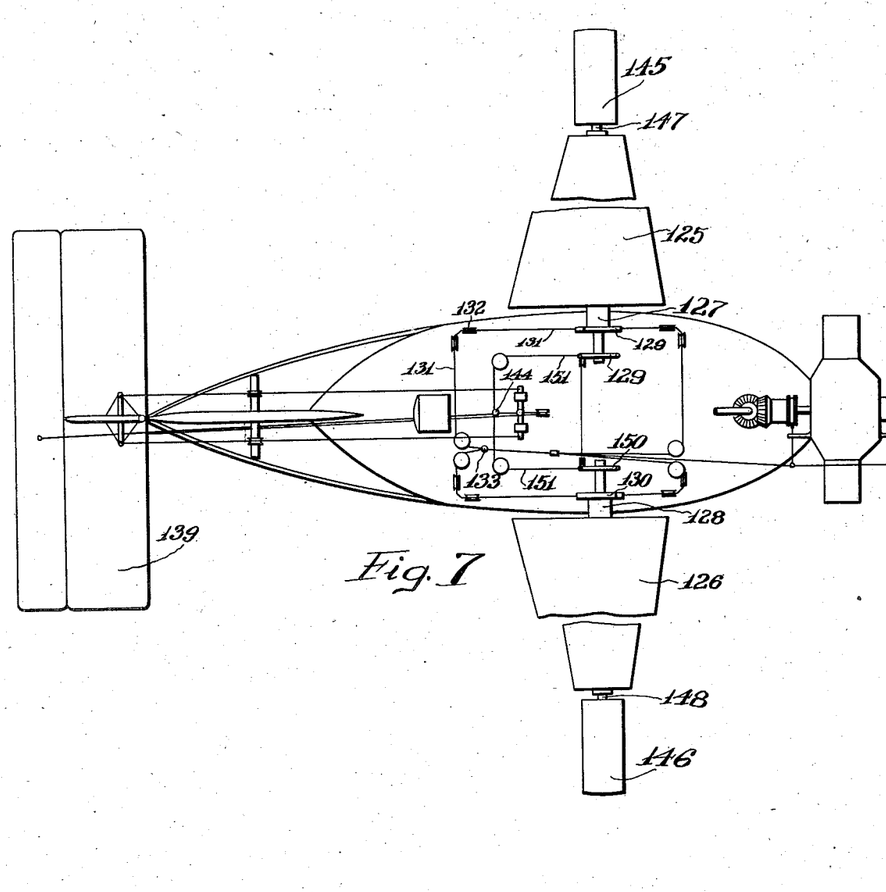
Figure 7 represents a top plan view of the same.
Figure 8:
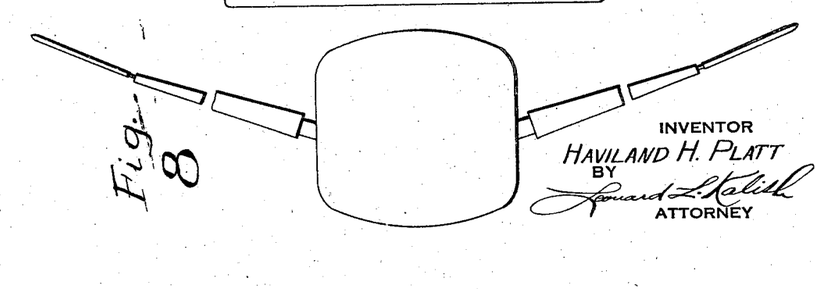
Figure 8 represents an end view of the craft showing the anti-torque surfaces.

Anti-torque surfaces may be provided on the aircraft of my invention, either according to the form shown in Figures 1, 2 and 3, or indicated in Figures 6, 7 and 8, or otherwise.

Thus I may provide anti-torque aerofoil members 98 of suitable cross-section carried fixedly by the fuselage, preferably at the rear end of the fuselage and extending generally upright and longitudinally of the fuselage. These anti-torque members 98 may be supported by any suitable supporting structure. The anti-torque members 98 are inclined in a direction as to cause them to exert a torque upon the fuselage (in a direction opposite to the torque incident to the transmission of power from fuselage to the rotor), when said anti-torque members are acted upon by the slip-stream of the rotor. One or more of the anti-torque members 98 may also be provided with a hinged "trailing edge" section along its lower edge, as for instance the section 99 which is hinged at 100, and which may be deflected in either direction by suitable control cables 101 and 102, attached to suitable bracings or arms 103 and 104 on either side of the aileron-like member 99 and extending over pulleys or sheaves 105 and 106 carried by a transverse stationary supporting member 107. The control cables 101 and 102 may be extended to any suitable foot or manual control, as for instance the rudder bar 108 pivoted at 109, and having foot treadles 110 and 111. By this means, the anti-torque effect of the member or members 98 may be varied under any condition within suitable limits required for practical operation. Thus, a lower pivotal section may be provided on each of the anti-torque members 98, similar to the one provided on the center member. So too, the number of anti-torque members 98 may be varied. I may also provide a stationary di-hedral surface or member 112 at the rear of the fuselage having the central horizontal portion 113 and the two laterally extending and upwardly inclined portions 114 and 115. The di-hedral member 112 may be provided to give stability to the craft.

In the embodiment of my invention shown, the blades 20 of the rotor 19 are shown as being hinged in two directions, about the pivots 116 and 117, extending generally transversely of each other. Thus, the generally horizontal pivots 116 may be provided to permit the blades to be deflected upwardly, while the generally upright pivots 117 may be provided to permit the blades to be deflected, within suitable limits, fore and aft. The pivotal support about the pivot 116 permits the blades to cone up when in flight. Thus the blades assume a position about their pivots 116, which is dependent upon the air pressure upon the blades, acting generally upwardly; the force of gravity acting upon the blades generally downwardly, and the centrifugal force incident to the rotation of the blades about the shaft 22, which latter force acts upon the blades in a generally outward radial direction. Similarly, the position assumed by the blades about their pivots 117 will be dependent upon the amount of torque being applied to the rotor shaft 22, the speed and the inertia of the blades, and also the air forces and centrifugal forces acting upon the blades. In order to limit the angular deflection of the blades about the pivots 116, droop-cables may be provided in a manner now known in the art, or fixed cantilever-type abutments 118 may be provided on the members 40 for limiting the downward droop of the intermediate links 119. If desired, a similar cantilever-type abutment may be provided above the links 119 to limit the upward deflection or "coning" of the blades. Similarly, cantilever-type abutments 120 and 121 may also be provided on each of the members 122 for limiting the fore and aft deflection of the rotor blades about their pivots 117. This is particularly desirable in starting the rotor or in accelerating the rotor by the application of additional power, which would have a tendency to leave the blades behind, about their pivots 117. By means of the deflection-limiting abutments 120 and 121 this deflection is limited to certain angles suitable for practical operation, so that the rotational lag or lead of the blades may be limited.

If desired, any suitable means may be provided in the rotor-pitch-control connections 53 and 55, whereby the differences in angularity of the rotor shaft may be compensated for in the rotor-pitch-control, or the rotor-pitch-control may be so arranged, that by reason of the fixed connections 53 and 55, the rotor blade pitch is increased or decreased, as may be desired, simultaneously with, and incident to the deflection of tilting of the rotor in a forward or aft direction, as may be most desirable for maneuvering the aircraft.

In Figures 6, 7, and 8, I have illustrated another embodiment of my invention, wherein the controls are effected by auxiliary control surfaces, such as the conventional rudder and elevator at the tail end of the fuselage, and whereby the torque on the fuselage, incident to the transmission of power from the engine to the rotor is counteracted by a pair of laterally extending surfaces similar to fixed wings, which may be placed in either one of two operative positions, one generally horizontal and the other generally upright, for causing the surfaces to respond to the slip-stream of the propeller and the slip-stream of the rotor, respectively.

In this embodiment of my invention the rotor 123 may be similar in all respects to the rotor 19 heretofore described, with each blade independently hinged to the hub for vertical deflection or "coning" and limited fore and aft deflection, and also pivoted for variation in pitch of the blades. Similarly, the pitch-varying mechanism may be similar to that shown in Figures 4 and 5, or may be any other suitable pitch-varying means. In these phases of my invention the rotor shaft 124 is immovably mounted or mounted with a fixed axis instead of having the swivel mounting heretofore described. The rotor-drive and propeller-drive and rotor and propeller clutches and propeller pitch-varying means may also be similar to that described in connection with the modification of my invention exemplified in Figures 1 to 5 inclusive, except that the two universal joints and the slip joint in the drive shaft leading to the rotor may be eliminated, particularly if sufficient rigidity is given to the pylon. In this embodiment of my invention also, a propeller clutch or a pitch-control device for the propeller may be provided at 78.

The fixed wings 125 and 126 are arranged to act as wings in forward flight and as anti-torque surfaces in vertical operation. This may be accomplished by the arrangement shown, by rotatably mounting the wings 125 and 126 on tubular spars 127 and 128 rigidly attached to the fuselage. At the inner ends of the wings 125 and 126, levers 129 and 130 are fixedly secured. These levers are actuated by cable lines 131 running over suitably pivoted and supported pulleys 132, which cables connect these levers with the lower end of a control lever 135 pivoted or fulcrumed at 134, which may also be attached to the rotor pitch control, to the rotor clutch control, and to the propeller clutch and pitch control;—in a manner similar to that shown in Figures 1 and 2, by means of cables similarly numbered. Thus it will readily be seen that pulling back on the handle of the lever 133, not only increases the rotor pitch and releases the clutch 78 and engages the clutch 75, but also moves the lever 129 to the left and the lever 130 in the same direction. Thus the wings 125 and 126 are rotated upon their supports 127 and 128, in such direction as to turn their leading edges upwardly. By giving the lever 129 slightly greater length than the lever 130, the wing 126 is caused to turn through a greater angle than the wing 125. Thus, with proper proportioning of the parts, the pulling back of the lever 133 into the vertical operating position, will cause the wing 125 to turn through somewhat less than a right angle and the wing 126 through somewhat more than a right angle. The result is that each will present an effective angle for co-operation with the slip-stream of the rotor, to oppose the torque reaction.

In the arrangement shown, the fuselage may be shortened to provide room for the fixed fin 135, which, although shown in the drawings as being vertical, may also be constructed with an inclination to assist the wings in overcoming torque reaction. Hinged to the bottom of the fin 135 is a flap 136 which serves to furnish directional control during vertical operation by attachment to the rudder bar 137 through the cables 138 in a manner similar to the directional control provided by the flap 99 shown in Figures 1 and 3. Behind the fin 65 is mounted, in a conventional manner, a fixed horizontal stabilizer 139 and horizontal and vertical rudders 140 and 141. The rudders 140 and 141 are connected by cables 142 and 143 to the conventional control stick 144 and to the rudder bar 137, respectively, as in standard practice. For rolling or lateral control in forward flight ailerons 145 and 146 may be provided, fixed to the ends of tubular shafts 147 and 148, which extend through the fixed tubular wing supports or spars 127 and 128, and which are rotatably mounted therein. To the inner ends of the shafts 147 and 148, levers 149 and 150 are secured. The levers 149 and 150 are interconnected and jointly connected to the control stick 144 by cables 151 which pass over suitable pulleys, in the manner shown, so that the lateral motion of the stick 144 will cause a displacement of the levers 149 and 150 in opposite directions, thus providing a control which will be responsive in a manner similar to the conventional ailerons.

In the drawings, merely diagrammatic representation has been made of the various elements, because my present invention is not dependent upon the construction or design of the elements per se.

It will of course be appreciated that although the propeller clutch or propeller pitch control means is shown interconnected with the rotor-pitch-control means, the same may also be independently operated.

It will be understood that in the vertical conditions of operation, that is, in more or less vertical ascent or descent, or in hovering condition, the adjustable anti-torque members 99 and 136 give directional control to the craft, so that it may be turned by virtue of the angular adjustment of these members.

In any of the several phases or embodiments of my invention hereinabove described, I may also vary the blade angle of the rotor blades automatically instead of through manual control, in such a manner that the blade angle will be at its minimum, (that is, at the angle required for auto-rotation) whenever no power is applied to the rotor, and so that the blade angle will be increased gradually by the power applied to the rotor, in proportion to the torque.

Thus, instead of connecting the power directly to the rotor shaft 22, the power may be delivered to a separate concentric shaft either surrounding the shaft 22 or extending through the shaft 22 (in which latter case the shaft 22 will be tubular) and transmitting the torque from one shaft to the other through spring members which would be deformed in proportion to the torque delivered, so that there will be a different angular disposition of the two shafts with respect to each other, according to the amount of torque being delivered from one to the other. This angular displacement of the driving shaft with respect to the driven shaft (according to the amount of torque being delivered) may then be transmitted to any suitable blade angle control means, such as the members 44, 45, 47, and 48, so that, as the springs are deformed more and more by the increase in torque (that is, power delivered), the blade angle will be automatically increased so as to provide a greater blade angle for the various conditions of vertical operation with power driven rotor, and so that when the power is removed from the rotor the blade angle will automatically shift back into the auto-rotative condition, that is, to the lesser angle.

In this manner the transition from auto-rotative-flight to power-driven-rotor-flight, and vice versa, may be effected more smoothly and with less effort and skill on the part of the operator.

In such automatic flight angle control of the rotor blades, the connections, such as the connection 53, are liminated.

By this means also, the transmission of power from engine to rotor may be more effectively cushioned through the spring members through which the power is actually transmitted from the driving shaft to the driven shaft of the rotor.

In any of the phases or embodiments of my invention hereinabove described, I may also mount the engine directly beneath the rotor instead of at the front of the fuselage. This I may do particularly in that phase or embodiment of my invention wherein the rotor is utilized for both forward propulsion as well as vertical operation by a tilting of the rotor to suitable angles (the front propeller being totally absent). In so mounting the engine directly beneath the rotor, the engine may be what is generally termed as a "geared-engine", that is, wherein reduction gearing is built into the engine housing, so that a low-speed shaft extends from the engine housing for utilization in actual drive. Such "geared-engine" with a suitably reduced speed drive shaft may be mounted beneath the rotor in a more or less pendent condition, with the drive shaft thereof extending upwardly and being connected directly to the rotor shaft 22, or to an intermediate driving shaft from which the power may then be transmitted to the rotor shaft proper through spring members, as stated hereinabove. The engine may either be made to tilt along with the tilting of the rotor or the power may be transmitted through suitable universal joints. In tilting the engine with the rotor, the engine body would be resiliently or slidably anchored to the fuselage or to the pylon, as the case may be. In the direction of maximum deflection, that is, in the fore and aft direction, the engine would be slidably or shiftably anchored (anchored against rotation), while in the direction of lesser deflection or tilting, that is, in the transverse direction, it may be spring-mounted or spring-confined, with the yield of the spring sufficient to permit the necessary lateral deflection of engine and rotor. In so mounting the engine, it is preferable to use a water-cooled engine with radiators suitably disposed with respect to the dominant air-streams or slip-streams.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. In an aircraft, in combination with a fuselage, a rotor having variable pitch blades; said rotor being adapted to be tilted in relation to the fuselage, a source of power, means for engaging and disengaging said rotor and said source of power at the will of the operator, and an anti-torque surface carried by the fuselage adapted to be acted upon by the slip-stream of the rotor, and means for varying the effectiveness of said anti-torque surface.

2. In an aircraft, in combination with a fuselage, a rotor adapted to be tilted in relation to the fuselage, a source of power, means for engaging and disengaging said rotor and said source of power at the will of the operator, and an anti-torque surface carried by the fuselage adapted to be acted upon by the slip-stream of the rotor, and means for varying the effectiveness of said anti-torque surface.

3. In an aircraft, the combination of a fuselage, a rotor having variable pitch blades, a propeller, a source of power, means common to the rotor and propeller for causing the major portion of the power output of said source of power to be delivered to the rotor or to the propeller, at the will of the operator, and control means for simultaneously varying the pitch of the rotor blades with the application of power to the rotor and with the cessation of power supplied to the rotor.

4. In an aircraft, the combination of a fuselage, a rotor having variable pitch blades, means for tilting said rotor in relation to the fuselage, a source of power, transmission mechanism for connecting said source of power with said rotor, said transmission mechanism including an overrunning clutch for enabling the rotor to rotate free of the source of power, and anti-torque means carried by the fuselage and adapted to be acted upon by the slip-stream of the rotor.

5. In an aircraft, the combination of a fuselage, a rotor, having variable pitch blades, means for tilting said rotor in relation to the fuselage, a source of power, means for connecting said source of power to said rotor and for permitting the rotor to be rotated free of said source of power, control means for simultaneously changing the pitch of the rotor blades with the application of power thereto, and an anti-torque surface carried by the fuselage, and adapted to be acted upon by the slip-stream of the rotor.

6. In an aircraft, the combination of a fuselage, a rotor having variable pitch blades, means for tilting said rotor in relation to the fuselage, a source of power and transmission mechanism for connecting said source of power with said rotor, said transmission mechanism including an overrunning clutch for enabling the rotor to rotate free of the source of power, and an anti-torque surface carried by the fuselage and adapted to be acted upon by the slip-stream of the rotor.

HAVILAND H. PLATT.